(12) United States Patent
Nakagawa (10) Patent No.: US 8,550,392 B2
(45) Date of Patent: Oct. 8, 2013

(54) DUAL-BEARING REEL CLUTCH CONTROL DEVICE

(75) Inventor: Shouji Nakagawa, Osaka (JP)

(73) Assignee: Shimano Inc., Osaka (JP)

( * ) Notice: Subject to any disclaimer, the term of this patent is extended or adjusted under 35 U.S.C. 154(b) by 311 days.

(21) Appl. No.: 13/208,851

(22) Filed: Aug. 12, 2011

(65) Prior Publication Data

US 2012/0067993 A1 Mar. 22, 2012

(30) Foreign Application Priority Data

Sep. 22, 2010 (JP) ................................. 2010-212097

(51) Int. Cl.
*A01K 89/01* (2006.01)

(52) U.S. Cl.
USPC ............ 242/261; 242/257; 242/259; 242/260

(58) Field of Classification Search
USPC .................. 242/257, 259, 260, 261, 262, 271
See application file for complete search history.

(56) References Cited

U.S. PATENT DOCUMENTS

| 5,222,995 | A | * | 6/1993 | Sato | 242/258 |
| 5,350,133 | A | * | 9/1994 | Morimoto | 242/261 |
| 5,607,117 | A | * | 3/1997 | Svensson | 242/261 |
| 5,772,139 | A | * | 6/1998 | Sato | 242/261 |
| 5,921,490 | A | * | 7/1999 | Sato | 242/261 |
| 6,598,817 | B2 | * | 7/2003 | Kitajima et al. | 242/257 |
| 7,798,439 | B2 | * | 9/2010 | Tsutsumi | 242/257 |
| 2002/0033426 | A1 | * | 3/2002 | Kitajima et al. | 242/261 |

FOREIGN PATENT DOCUMENTS

JP 2010-172203 A 8/2010

* cited by examiner

*Primary Examiner* — Emmanuel M Marcelo
(74) *Attorney, Agent, or Firm* — Global IP Counselors, LLP (57) ABSTRACT

A dual-bearing reel clutch control device includes a tubular clutch cam, a clutch yoke, and a coupling yoke. The tubular clutch cam is configured to be rotated between a coupled position and a decoupled position in conjunction with movement of the clutch operating member between the first position and the second position. The clutch yoke is engaged with the clutch mechanism. The coupling member is configured to couple the tubular clutch cam and the clutch operating member, and configured to rotate the tubular clutch cam between the coupled position and the decoupled position The clutch return mechanism is coupled with the tubular clutch cam and the coupling member. The clutch return member includes a rotation member attached to a rotation shaft of the handle, a clutch return member, and a toggle spring member configured to urge the clutch return member towards either the engaged position or the disengaged position.

6 Claims, 9 Drawing Sheets

DUAL-BEARING REEL CLUTCH CONTROL DEVICE

CROSS-REFERENCE TO RELATED APPLICATIONS

This application claims priority to Japanese Patent Application No. 2010-212097 filed on Sep. 22, 2010. The entirety disclosure of Japanese Patent Application No. 2010-212097 is hereby incorporated by reference.

BACKGROUND OF THE INVENTION

1. Field of the Invention

The present invention relates to a control device, particularly to a clutch control device for causing a clutch mechanism to couple or decouple a handle attached to a reel unit of a dual-bearing reel and a spool configured to be rotated by the handle.

2. Background Art

A dual-bearing reel normally includes a clutch mechanism disposed between a handle and a spool. The clutch mechanism is configured to couple and decouple the handle and the spool. When the handle and the spool are coupled, the spool is configured to rotate in conjunction with rotation of the handle. When the handle and the spool are decoupled, in contrast, the spool is allowed to rotate freely. The clutch mechanism is configured to be switched between a clutch-on state and a clutch off-state by a clutch control mechanism (an example of the clutch control device) including a clutch operating member. Japan Laid-open Patent Application Publication No. 2010-172203 describes an example of the well-known clutch control mechanisms including a clutch operating member, a tubular clutch cam made of synthetic resin, a clutch yoke, a coupling member made of metal and a clutch return mechanism.

In the well-known clutch control mechanism, the clutch cam is a tubular member made of synthetic resin and is coupled to the clutch operating member through the coupling member made of metal. The clutch cam is configured to be rotated between a clutch-on position and a clutch-off position in conjunction with an operation of the clutch operating member. The clutch yoke is engaged with a cam surface formed on the clutch cam and is configured to move a pinion gear forming a part of the clutch mechanism in an axial outward direction of the spool shaft in conjunction with rotation of the clutch cam towards the clutch-off position. The coupling member is unitarily rotatable with the clutch cam. The clutch operating member is fixed to the coupling member.

The clutch return mechanism includes a rotation member, a clutch return member, and a toggle spring member. The rotation member is disposed onto the handle shaft while being unitarily rotatable therewith. One end of the clutch return member is rotatably coupled to the clutch cam. Specifically, a coupling pin is integrally formed with the aforementioned end of the clutch return member while being engaged with a coupling hole formed in the clutch cam. The clutch return member is configured to move back and forth between an engaged position and a disengaged position. The clutch return member is allowed to be engaged with the rotation member in the engaged position. On the other hand, the clutch return member is prevented from being engaged with the rotation member in the disengaged position. When the clutch cam is rotated to the clutch-off position in conjunction with an operation of the clutch operating member, the other end of the clutch return member is moved to the engaged position. The toggle spring member urges the clutch return member to either the engaged position or the disengaged position.

In the clutch return mechanism, the rotation member is configured to press the clutch return member set to be in the engaged position across the dead center of the toggle spring member when the handle is rotated in the fishing line winding direction. The clutch return member is thereby returned to the disengaged position by the urging force of the toggle spring member. When the clutch return member is moved to the disengaged position, the clutch cam is rotated from the clutch-off position to the clutch-on position. The clutch mechanism is thus returned to the clutch-on state.

In the well-known clutch control mechanism, the coupling member includes a protrusion. The protrusion is separate away from the clutch cam but is allowed to make contact with the clutch cam. The structure prevents the clutch cam from receiving excessive force when the handle is rotated in the fishing line winding direction while the clutch operating member is incorrectly operated and pressed to the clutch-on position. In other words, when the clutch cam receives excessive force and is deformed, the clutch cam makes contact with the protrusion and is thereby prevented from being further deformed.

According to the well-known clutch control mechanisms, the clutch cam is deformed if the clutch operating member is kept operated in the clutch-on position while the clutch-on operation is executed by rotating the handle in the fishing line winding direction. Accordingly, the clutch return member directly gets contact with the coupling member. In other words, rotational force from the handle will be directly transmitted to the clutch operating member. Anglers thereby notice that the clutch operating member receives force applied in a clutch returning direction and/or that force is necessary in rotating the handle for slightly deforming the clutch cam as well as for executing a normal clutch returning operation. Thus, anglers recognize their incorrect operations.

SUMMARY

However, the clutch control mechanisms are normally structured based on the premise that the clutch cam is deformed. Therefore, force is required to slightly deform the clutch cam even in a normal clutch returning operation. In other words, the handle is required to be strongly rotated for executing a clutch returning operation.

In view of the above, the present invention addresses a need to produce a clutch control mechanism for allowing an angler to execute a clutch returning operation without strongly rotating a handle.

A dual-bearing reel clutch control device is provided. The dual-bearing reel clutch control device controls a clutch mechanism to couple and decouple a handle attached to a reel unit and a spool configured to be rotated by the handle in conjunction with an operation of a clutch operating member. The clutch operating member is movable between a first position and a second position.

The dual-bearing reel clutch control device includes a tubular clutch cam, a clutch yoke, a coupling member, and a clutch return mechanism. The tubular clutch cam attached to the reel unit to be rotated about a center axis of the spool. The tubular clutch cam is configured to be rotated between a coupled position and a decoupled position in conjunction with movement of the clutch operating member between the first position and the second position. The clutch mechanism is in a coupled state with which the handle is coupled with the spool when the clutch operating member is in the first position. The clutch mechanism is in a decoupled state with which the handle is decoupled with the spool when the clutch operating member is in the second position. The clutch yoke is engaged with the clutch mechanism. The clutch yoke is configured to be movable in an axial direction of the spool in conjunction with rotation of the tubular clutch cam for switching the clutch mechanism between the coupled state and the decoupled state. The coupling member is configured to couple the tubular clutch cam and the clutch operating member. The coupling member is configured to rotate the tubular clutch cam between the coupled position and the decoupled position in conjunction with the movement of the clutch operating member between the first position and the second position. The clutch return mechanism is coupled with the tubular clutch cam and the coupling member.

The clutch return mechanism including a rotation member, a clutch return member, and a toggle spring. The rotation member is attached to a rotation shaft of the handle. The clutch return member has a first end and a second end. The clutch return member is configured to be moved between an engaged position and a disengaged position. The toggle spring member is configured to urge the clutch return member towards either the engaged position or the disengaged position. The first end thereof is interposed and held between the tubular clutch cam and the coupling member. The clutch return member is configured to be movable from the disengaged position to the engaged position in order to allow the second end to be engaged with the rotation member in conjunction with rotation of the tubular clutch cam from the coupled position to the decoupled position. The clutch return member is configured to be movable from the engaged position to the disengaged position while the second end is pressed by the rotation member in conjunction with rotation of the handle in a fishing-line winding direction for returning each of the tubular clutch cam and the coupling member to the coupled position.

BRIEF DESCRIPTION OF THE DRAWINGS

Referring now to the attached drawings which form a part of this original disclosure.

DETAILED DESCRIPTION OF THE EMBODIMENTS

Figure 1:
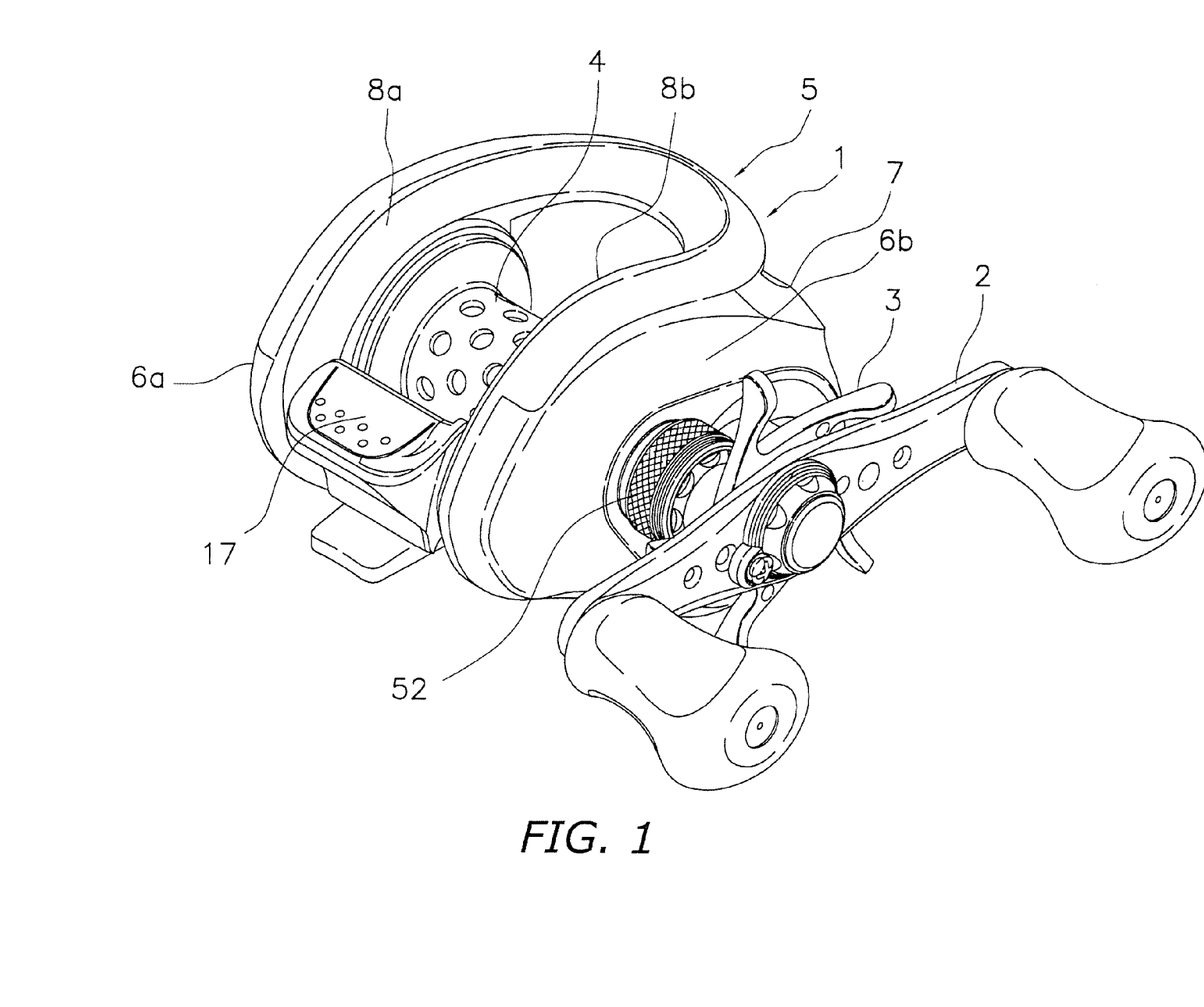
FIG. 1 is a perspective view of a dual-bearing reel adopting an exemplary embodiment of the present invention.
Figure 2:
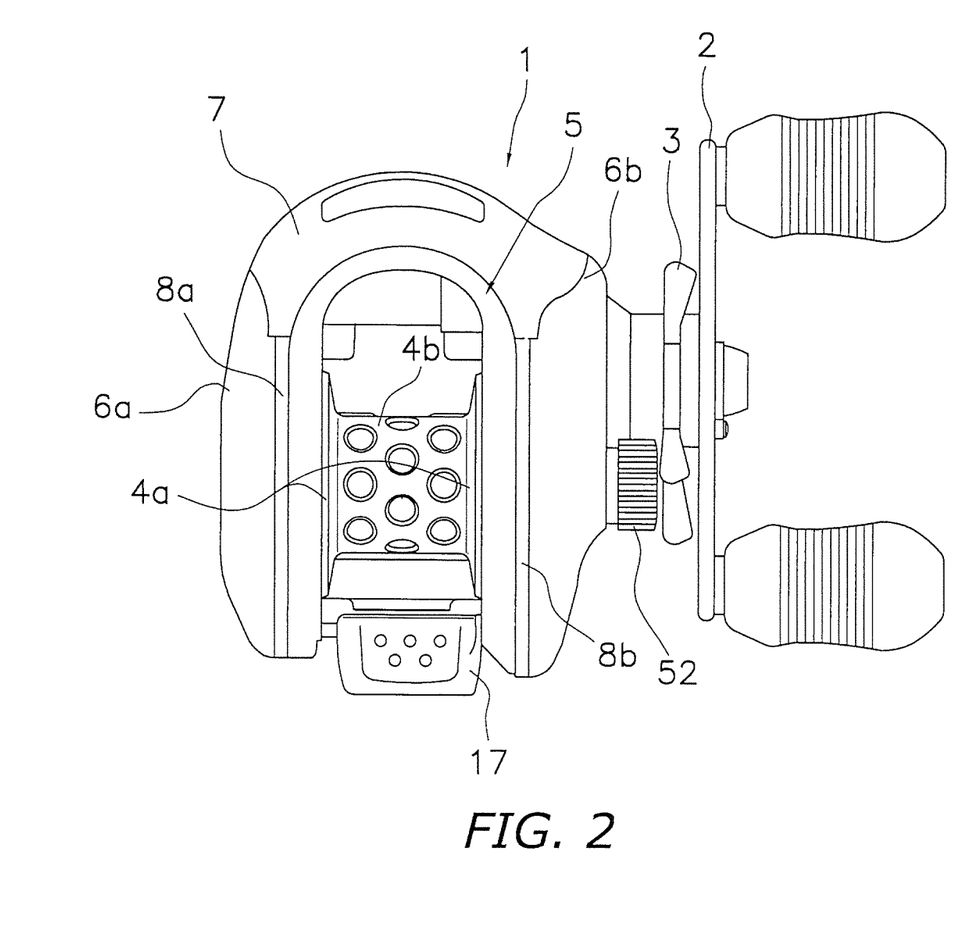
FIG. 2 is a plan view of the dual-bearing reel.

FIG. 1 illustrates a perspective view of a dual-bearing reel adopting an exemplary embodiment of the present invention, whereas FIG. 2 illustrates a plan view of the dual-bearing reel. For example, the dual-bearing reel illustrated in FIGS. 1 and 2 is a low profile bait-casting reel. The dual-bearing reel includes a reel unit 1, a handle 2, a star drag 3, and a spool 4. The reel unit 1 is attachable to a fishing rod. The handle 2 is disposed lateral to the reel unit 1 for rotating the spool 4. The star drag 3 is disposed between the reel unit 1 and the handle 2 for regulating drag force. The spool 4 is rotatably attached to the reel unit 1. Further, a clutch operating member 17 is attached to the rear part of the reel unit 1.

Reel Unit Structure

The reel unit 1 includes a frame 5, a first side cover 6a, a second side cover 6b and a front cover 7. The frame 5 is made of, for instance, metal such as aluminum alloy or magnesium alloy. The first and second side covers 6a and 6b are attached to the frame 5 for covering the both lateral sides of the frame 5. The first and second side cover 6a and 6b are made of, for instance, aluminum alloy or synthetic resin. The front cover 7 is attached to the front side of the frame 5. The front cover 7 is made of, for instance, aluminum alloy or synthetic resin.

Figure 4:
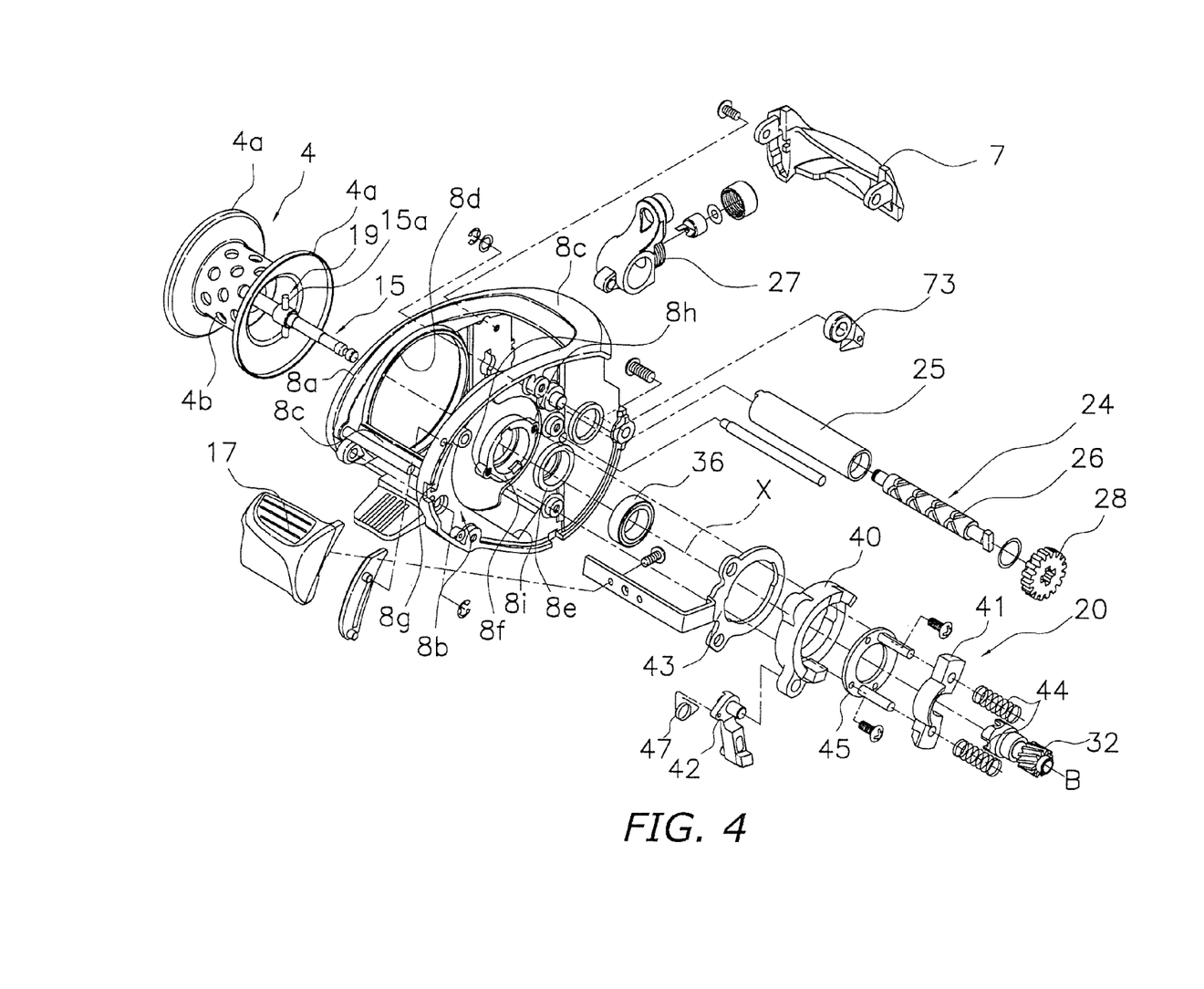
FIG. 4 is an exploded perspective view of the center part of the dual-bearing reel.

As illustrated in FIG. 4, the frame 5 includes a pair of a first side plate 8a and a second side plate 8b, and a plurality of coupling portions 8c. The first and second side plates 8a and 8b are opposed at a predetermined interval. The coupling portions 8c couple the first side plate 8a and the second side plate 8.

The first side plate 8a is a roughly plate-shaped member including a circular opening 8d for taking the spool 4 to the outside. For example, a bearing housing (not illustrated in the figure), which is made of aluminum alloy, is screwed and fixed to the opening 8d.

The second side plate 8b supports a clutch control mechanism 20 and a rotation transmission mechanism 18, both of which are to be described.

The first side cover 6a is allowed to open and close the frame 5. Specifically, the first side cover 6a is attached to the frame 5, while being allowed to pivot between a position to make contact with the frame 5 and a position separated away from the frame 5.

Figure 3:
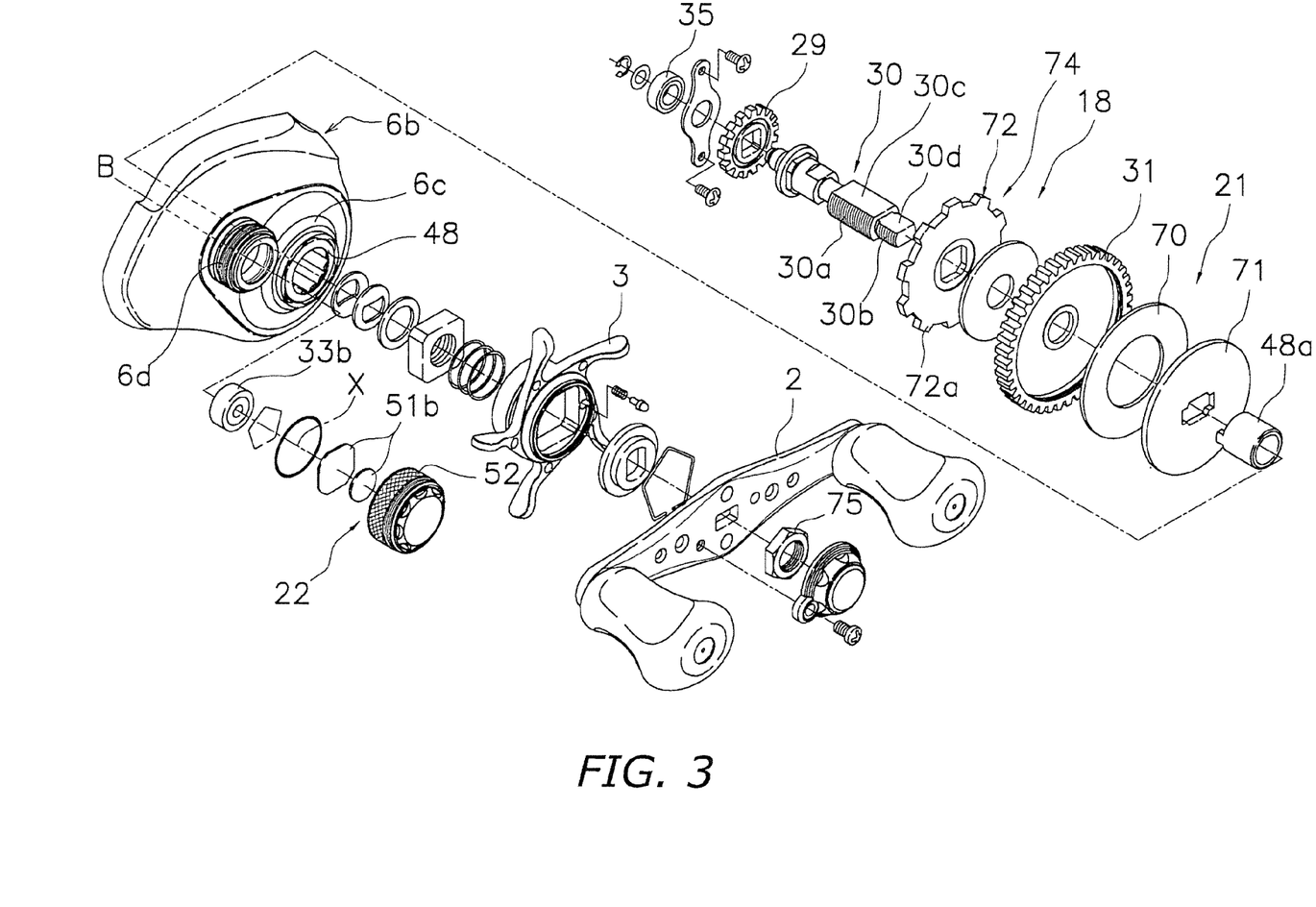
FIG. 3 is an exploded perspective view of the right part of the dual-bearing reel.

As illustrated in FIG. 3, the second side cover 6b is a roughly bowl-shaped member including a first boss 6c, a second boss 6d, and the like. The first boss 6c herein supports a handle shaft 30, whereas the second boss 6d supports a spool shaft 15.

Figure 5:
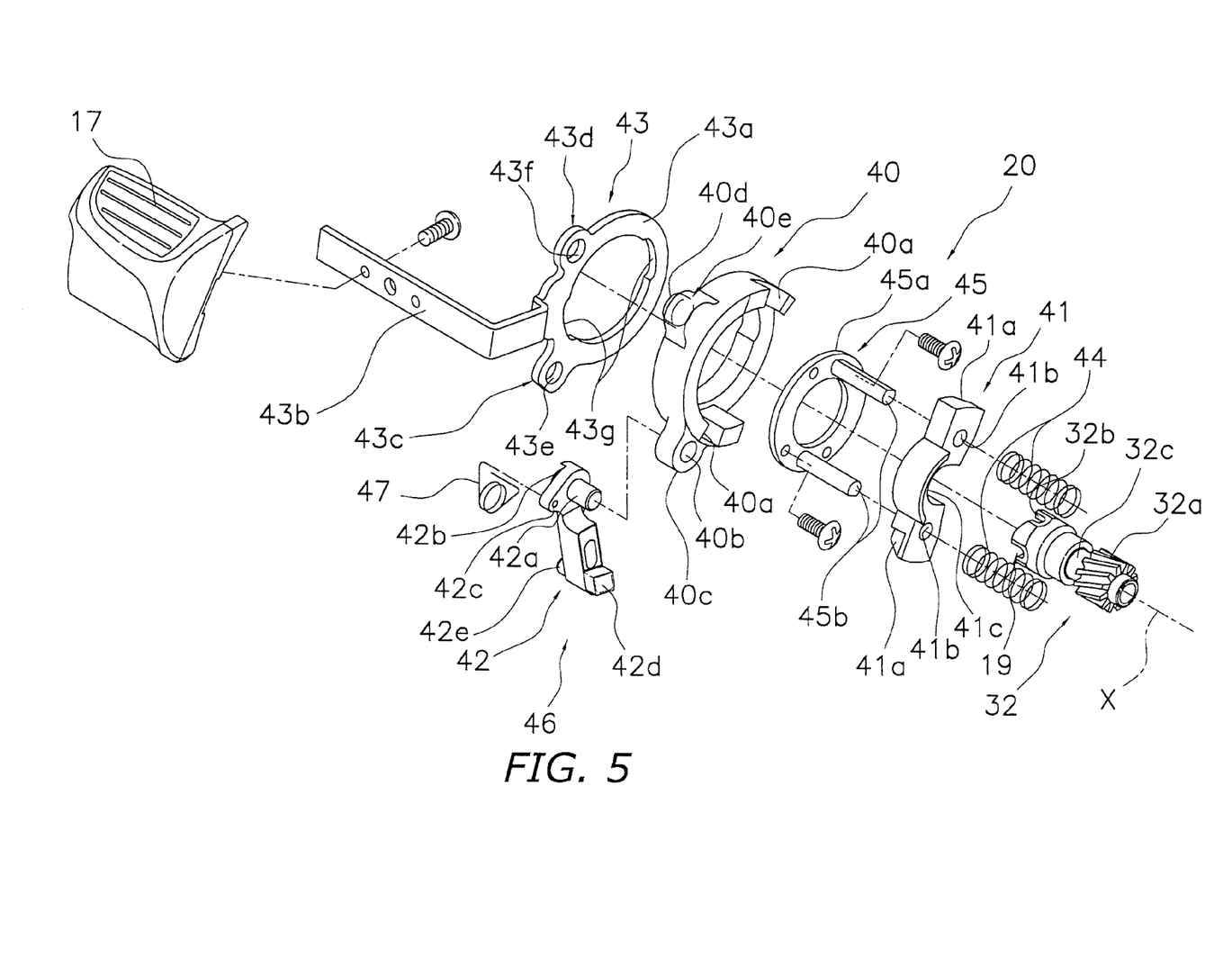
FIG. 5 is an exploded perspective view of a clutch control mechanism for illustrating its structure.

As illustrated in FIGS. 2, 3 and 4, the frame 5 accommodates the spool 4 (see FIG. 2), a level winding mechanism 24 (see FIG. 4), the clutch operating member 17 (see FIG. 4), and a clutch mechanism 19 (see FIGS. 4 and 5). The spool 4 is rotatably disposed between the first side plate 8a and the second side plate 8b. The level winding mechanism 24 is configured to uniformly wind a fishing line about the spool 4. The clutch operating member 17 functions as a thumb pad in thumbing the fishing line. The clutch mechanism 19 is configured to couple and decouple the handle 2 and the spool 4. Further, the rotation transmission mechanism 18 (see FIG. 3), the clutch control mechanism 20 (see FIG. 4), a drag mechanism 21 (see FIG. 3), and a casting control mechanism 22 (see FIG. 3) are disposed between the frame 5 and the second side cover 6b. The rotation transmission mechanism 18 is configured to transmit rotational force from the handle 2 to the spool 4 and the level winding mechanism 24. The clutch control mechanism 20 is configured to control the clutch mechanism 19 in response to an operation of the clutch operating member 17. The drag mechanism 21 is configured to brake the spool 4 in releasing the fishing line. The casting control mechanism 22 is configured to regulate resistance to be produced in rotation of the spool 4.

The casting control mechanism 22 includes a plurality of brake liners 51b and a cap 52. The brake liners 51b are abutted to the both ends of the spool shaft 15 from the axial outside of the spool shaft 15. The cap 52 is configured to regulate abutting pressure of the brake liners 51b against the spool shaft 15.

The spool 4 includes a pair of flanges 4a on the both lateral sides thereof. The spool 4 further includes a bobbin trunk 4b between the flanges 4a. The spool 4 is fixed onto the spool shaft 15 penetrating the center of the spool 4. Further, the spool shaft 15 is rotatably supported by the reel unit 1 through bearings (not illustrated in the figure).

As illustrated in FIG. 4, the level winding mechanism 24 includes a guide tube 25, a worm shaft 26, a line guide 27, and a driven gear 28. The guide tube 25 is fixed between the first side plate 8a and the second side plate 8b. The worm shaft 26 is rotatably supported within the guide tube 25. The driven gear 28 is made of metal. The driven gear 28 is attached to an axial end of the worm shaft 26 and receives rotation transmitted from the rotation transmission mechanism 18.

In the level winding mechanism 24 thus structured, the driven gear 28 is made of metal. Strength of the level winding mechanism 24 is thereby enhanced. Accordingly, the line guide 27 can guide the fishing line even if large force is applied on the line guide 27.

Structures of Rotation Transmission Mechanism and Clutch Mechanism

As illustrated in FIGS. 3 and 4, the rotation transmission mechanism 18 includes the handle shaft 30, a master gear 31 (see FIG. 3), a pinion gear 32 (see FIG. 4), and a driving gear 29 (see FIG. 3). The master gear 31 is rotatably attached onto the handle shaft 30 (see FIG. 3). The pinion gear 32 is meshed with the master gear 31. The driving gear 29 is attached onto the handle shaft 30 in a unitarily rotatable state while being disposed away from the master gear 31. The handle shaft 30 is prevented from rotating in a fishing-line releasing direction by a roller-type one-way clutch 48 accommodated in the first boss 6c of the second side cover 6b. Specifically, a pressure plate 71 to be described is engaged with the handle shaft 30 in a unitarily rotatable state while being engaged with an inner race 48a of the one-way clutch 48 in a unitarily rotatable state. The inner race 48a of the one-way clutch 48 is rotatable only in the fishing-line winding direction. The handle shaft 30 is thereby prevented from rotating in the fishing-line releasing direction. Further, a ratchet wheel 72 (an example of a rotation member) of a clutch return mechanism 46 to be described is attached onto the handle shaft 30 in a unitarily rotatable state. It should be noted that the ratchet wheel 72 is configured to be engaged with a ratchet claw 73 illustrated in FIG. 4 and forms a claw-type one-way clutch 74 with the ratchet claw 73. Further, the handle shaft 30 includes a first screw portion 30a and a second screw portion 30b on the outer peripheral surface thereof. The star drag 3 is screwed onto the first screw portion 30a, whereas a nut 75 is screwed onto the second screw portion 30b for fixing the handle 2. The second screw portion 30b has a diameter smaller than that of the first screw portion 30a. Yet further, the handle shaft 30 includes a parallel pair of first engaging surfaces 30c and a parallel pair of second engaging surfaces 30d on the outer peripheral surface thereof. The first engaging surfaces 30c are engaged with members attached onto the handle shaft 30 in a unitarily rotatable state (e.g., the pressure plate 71, the driving gear 29 and the ratchet wheel 72). The second engaging surfaces 30d are engaged with the handle 2. The intermediate part of the handle shaft 30 is supported by the one-way clutch 48, whereas the base end of the handle shaft 30 is rotatably supported by a bearing 35 attached to the second side plate 8b.

The bearing 35 is attached to a first boss 8e formed on the second side plate 8b as illustrated in FIG. 4.

The master gear 31 is a helical gear and receives rotation of the handle 2 transmitted through the drag mechanism 21.

The pinion gear 32 is a helical gear disposed on the outer peripheral side of the spool shaft 15. As illustrated in FIG. 5, the pinion gear 32 includes a helical teeth portion 32a, an engaged groove 32b, and a small diameter portion 32c. The teeth portion 32a is formed on the outer periphery of one end of the pinion gear 32 for meshing with the master gear 31. The engaged groove 32b is formed on the surface of the other end of the pinion gear 32. The small diameter portion 32c is formed between the tooth portion 32a and the engaged groove 32b. The engaged groove 32b is allowed to be engaged with or disengaged from an engaging pin 15a (see FIG. 4) attached to the spool shaft 15. Further, the outer peripheral surface of the part where the engaged groove 32b is formed is rotatably supported by the second side plate 8b through a bearing 36. The bearing 36 is attached to a second boss 8f of the second side plate 8b. The driving gear 29 is meshed with the driven gear 28 for transmitting rotation of the handle 2 to the level winding mechanism 24.

The engaged groove 32b of the pinion gear 32 and the engaging pin 15a of the spool shaft 15 form the clutch mechanism 19 configured to allow or prevent transmission of rotational force between the handle 2 and the spool 4. A clutch-off state (i.e., a decoupled state) is herein produced when the pinion gear 32 is outwardly moved and the engaging pin 15a of the spool shaft 15 is thereby disengaged from the engaged groove 32b. Accordingly, rotational force from the handle shaft 30 is blocked and is thus prevented from being transmitted to the spool shaft 15. Therefore, the spool 4 is allowed to freely rotate. On the other hand, a clutch-on state (i.e., a coupled state) is produced when the pinion gear 32 is inwardly moved and the engaging pin 15a is thereby engaged with the engaged groove 32b. Accordingly, rotation of the handle 2 is transmitted to the spool 4.

Drag Mechanism Structure

As illustrated in FIG. 3, the drag mechanism 21 includes a friction plate 70 and the pressure plate 71. The friction plate 70 is configured to press the master gear 31. The pressure plate 71 is configured to press the friction plate 70 towards the master gear 31 with a predetermined force in conjunction with an operation of rotating the star drag 3. The friction plate 70 is rotatably attached to the handle shaft 30. The pressure plate 71 is attached onto the handle shaft 30 in a unitarily rotatable state.

Clutch Operating Member Structure

Figure 6:
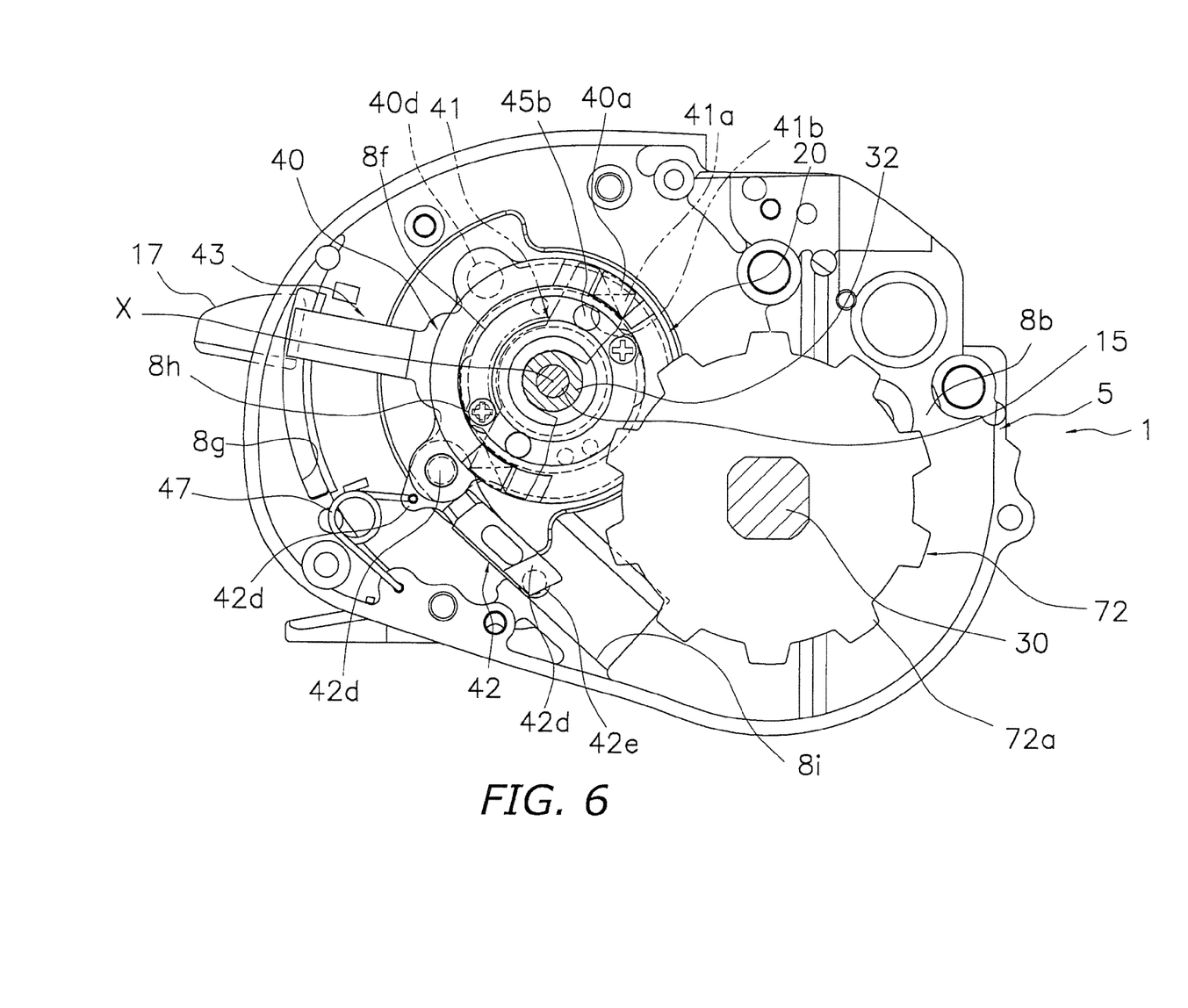
FIG. 6 is a side view of the dual-bearing reel for illustrating the clutch control mechanism set to be in a coupled state.
Figure 7:
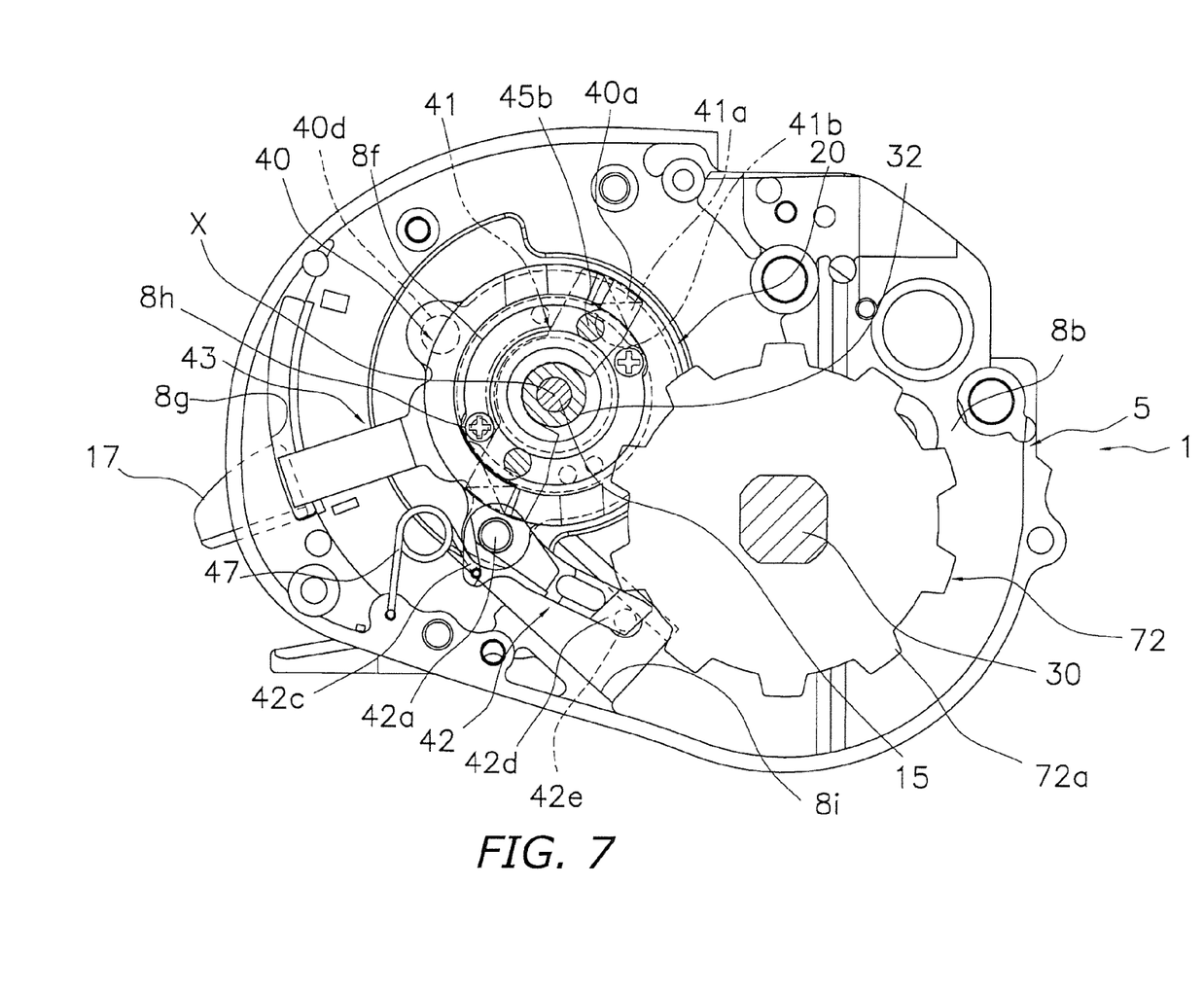
FIG. 7 is a side view of the dual-bearing reel for illustrating the clutch control mechanism set to be in a decoupled state.

The clutch operating member 17 is coupled to the clutch control mechanism 20 while being allowed to be moved between an engaged position (an example of a first position) illustrated in FIG. 6 and a disengaged (an example of a second position) illustrated in FIG. 7. The clutch operating member 17 is disposed on the rear part of the reel frame 5 of while being disposed between the first side plate 8a and the second side plate 8b. The clutch operating member 17 is used as a thumb pad in thumbing the fishing line.

Clutch Control Mechanism Structure>

As illustrated in FIG. 4, the clutch control mechanism 20 includes a clutch cam 40 made of synthetic resin, a clutch yoke 41 made of synthetic resin, a coupling member 43 made of metal, and the clutch return mechanism 46 (an example of a clutch return device). The clutch cam 40 is herein configured to rotate about a spool axis X in response to an operation of the clutch operating member 17. Further, the clutch control mechanism 20 includes coil springs 44 for urging the clutch yoke 41 in the axial inward direction of the spool shaft 15.

Clutch Cam Structure

As illustrated in FIGS. 5, 6, 7, and 8, the clutch cam 40 is a roughly cylindrical member and is attached onto the second boss 8f of the second side plate 8b while being rotatable about the spool axis X. The clutch cam 40 is rotatable between a decoupled position (corresponding to the clutch-off state) illustrated in FIG. 7 and a coupled position (corresponding to the clutch-on state) illustrated in FIG. 6. As illustrated in FIG. 5, the clutch cam 40 includes a pair of cam surfaces 40a on the outer surface thereof (i.e., the right surface in FIG. 5). The cam surfaces 40a are slanted surfaces for pressing the clutch yoke 41 in the axial outward direction of the spool shaft 15. Further, the clutch cam 40 includes a coupling hole 40b (an example of a first coupling recess) for allowing a clutch claw 42 described below to be rotatably coupled thereto. The coupling hole 40b is formed in a first coupling portion 40c protruding from the cam surfaces 40a in a radial outward direction. The clutch cam 40 includes a second coupling portion 40e on the outer peripheral surface thereof. The second coupling portion 40e protrudes in a radial outward direction. The second coupling portion 40e is integrally formed with a coupling protrusion 40d. The coupling protrusion 40d is formed for allowing the clutch cam 40 to be unitarily rotate with the coupling member 43. The second coupling portion 40e is circumferentially separate from the first coupling portion 40c. The clutch cam 40 includes a pair of contact avoiding portions 40f on the inner peripheral surface thereof. The contact avoiding portions 40f are circular-arc recesses disposed on the diameter of the inner peripheral surface of the clutch cam 40. That means that one of the recesses is 180 degree away from the other. The contact avoiding portions 40f are formed for allowing the clutch cam 40 to partially avoid making contact with a pair of attachment protrusions 8h radial-outwardly protruding from the outer periphery of the second boss 8f. The rotation range of the clutch cam 40 is herein restricted by abutment of the contact avoiding portions 40f to the attachment protrusions 8h.

Clutch Yoke Structure

The clutch yoke 41 is engaged with the clutch cam 40. The clutch yoke 41 is configured to move the pinion gear 32 in the axial direction of the spool shaft 15 in conjunction with rotation of the clutch cam 40. The clutch yoke 41 includes a pair of cam receivers 41a on the inner surface thereof. The cam receivers 41a are point-symmetrically positioned and receive the cam surfaces 40a. While the cam surfaces 40a are engaged with the cam receivers 41a, the clutch yoke 41 is pressed in the axial outward direction of the spool shaft 15. The clutch yoke 41 is guided by a guide member 45 fixed to the second boss 8f in the axial direction of the spool shaft 15. The guide member 45 includes a fixation portion 45a and a pair of guide shafts 45b. The fixation portion 45a is an annular portion fixed to the attachment protrusions 8h of the second boss 8f by screws. The guide shafts 45b are raised upright on the fixation portion 45a. The clutch yoke 41 includes a pair of guide holes 41b to be guided by the guide shafts 45b.

The clutch yoke 41 is urged by the coil springs 44 attached onto the outer periphery of the guide shafts 45b in the axial inward direction of the spool shaft 15 (i.e., leftward in FIG. 5). The coil springs 44 are disposed in a compressed state between the inner surface of the second side cover 6b and the outer surface of the clutch yoke 41. Further, the clutch yoke 41 includes a semicircular fitting groove 41c on the center part thereof. The small diameter portion 32c of the pinion gear 32 is fitted to the fitting groove 41c. With the fitting groove 41c, the clutch yoke 41 is configured to move the pinion gear 32 in the axial direction of the spool shaft 15.

Coupling Member Structure

The coupling member 43 is disposed for rotating the clutch cam 40 in conjunction with an operation of the clutch operating member 17. The coupling member 43 is a plate member made of, for instance, stainless alloy. The coupling member 43 is disposed between the clutch cam 40 and the outer surface of the second side plate 8b. The coupling member 43 includes an attachment portion 43a, an operating member fixation portion 43b, a first protrusion 43c and a second protrusion 43d. The attachment portion 43a is rotatably attached to the second boss 8f. The second protrusion 43d is radially extended along the second coupling portion 40e.

The attachment portion 43a is a roughly washer-like portion. The attachment portion 43a is disposed about the second boss 8f while being disposed between the clutch cam 40 and the outer surface of the second side plate 8b. The attachment portion 43a includes a pair of contact avoiding portions 43g on the inner peripheral surface thereof. Similarly to the contact avoiding portions 40f, the contact avoiding portions 43g are circular-arc recesses for allowing the coupling member 43 to partially avoid making contact with the attachment protrusions 8h.

The operating member fixation portion 43b is extended roughly rearwards from the attachment portion 43a. Specifically, the operating member fixation portion 43b is radially extended from the attachment portion 43a and is then bent in substantially parallel to the spool axis X. The clutch operating member 17 is fixed to the bent portion of the operating member fixation portion 43b by means of a screw. As illustrated in FIG. 4, the operating member fixation portion 43b protrudes towards the inner surface of the first side plate 8a while penetrating through a circular-arc slit 8g formed in the rear part of the second side plate 8b.

As illustrated in FIG. 5, the first protrusion 43c is radially extended along the first coupling portion 40c of the clutch cam 40. The first protrusion 43c and the clutch cam 40 interpose the base end of the clutch claw 42 therebetween. The first protrusion 43c includes a claw coupling hole 43c (an example of a second coupling recess) to be coupled to the clutch claw 42. The second protrusion 43d is radially extended along the second coupling portion 40e of the clutch cam 40. The second protrusion 43d includes a cam coupling hole 43f to be coupled to the coupling protrusion 40d of the clutch cam 40.

Clutch Return Mechanism Structure

The clutch return mechanism 46 is configured to return the clutch mechanism 19 set to be in the clutch off-state to the clutch-on state in conjunction with rotation of the handle 2 in the fishing-line winding direction. The clutch return mechanism 46 includes the ratchet wheel 72, the clutch claw 42 (an example of a clutch return member) and a toggle spring member 47. As described above, the ratchet wheel 72 is attached onto the handle shaft 30 in a unitarily rotatable state and functions as a rotation member. The clutch claw 42 is coupled to the clutch cam 40.

As described above, the ratchet wheel 72 also functions as the one-way clutch 74 configured to prevent the handle shaft 30 from rotating in the fishing-line releasing direction. The ratchet wheel 72 is attached onto the handle shaft 30 while being prevented from rotating. As illustrated in FIGS. 3, 6, and 7, the ratchet wheel 72 includes a plurality of teeth 72a on the outer periphery thereof. The teeth 72a are aligned at predetermined intervals along the rotation direction of the ratchet wheel 72.

Figure 8:
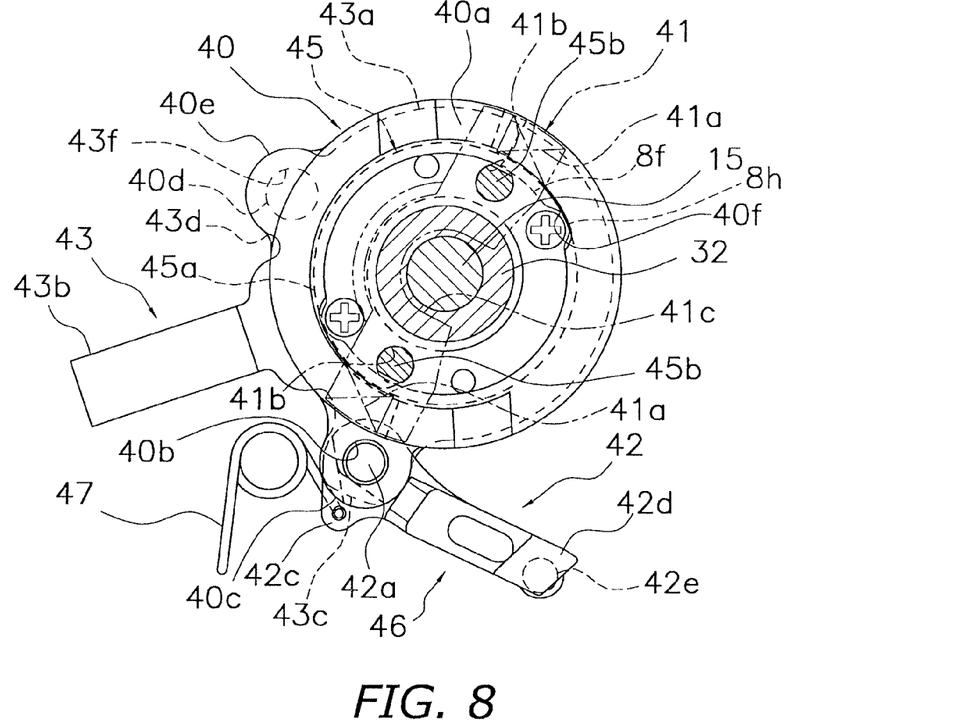
FIG. 8 is an enlarged side view of the main part of the clutch control mechanism set to be in the decoupled state.
Figure 9:
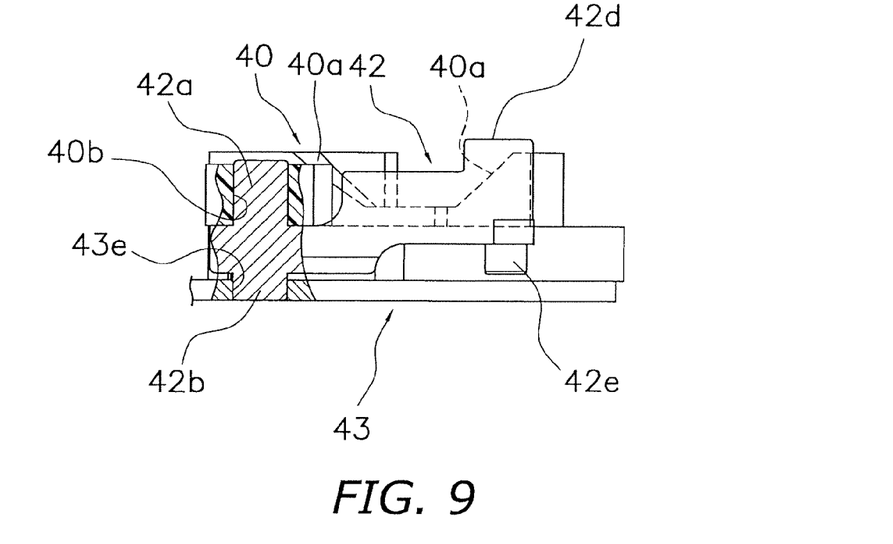
FIG. 9 is a partial cutaway view of the main part of the clutch control mechanism illustrated in FIG. 8.

As illustrated in FIGS. 5 and 8, the clutch claw 42 is a member made of, for instance, sintered stainless alloy. As illustrated in FIGS. 8 and 9, the clutch claw 42 includes a first coupling protrusion 42a and a second coupling protrusion 42b on the base end thereof (i.e., the top end in FIG. 5, an example of a first end). The first coupling protrusion 42a is fitted into the coupling hole 40b of the clutch cam 40. The second coupling protrusion 42b is fitted into the claw coupling hole 43e of the coupling member 43. The first coupling protrusion 42a is a columnar portion protruding towards the clutch cam 40. The second coupling protrusion 42b is a columnar portion protruding towards the coupling member 43. The second coupling protrusion 42b is disposed concentric with the first coupling protrusion 42a. As illustrated in FIG. 9, the clutch claw 42 is thus held by the clutch cam 40 and the coupling member 43 while being interposed therebetween. Simultaneously, the clutch claw 42 is rotatably coupled to the clutch cam 40 and the coupling member 43.

As illustrated in FIGS. 6 and 7, the clutch claw 42 includes a spring holding portion 42c on the base end thereof. The spring holding portion 42c holds one end of the toggle spring member 47. For example, the toggle spring member 47 is a torsion coil spring. The other end of the toggle spring member 47 is held by the outer surface of the second side plate 8b. The clutch claw 42 is configured to be moved between the disengaged position (see FIG. 6) and the engaged position (see FIG. 7) in conjunction with rotation of the clutch cam 40. The toggle spring member 47 is configured to urge the clutch claw 42 towards either the disengaged position or the engaged position. Accordingly, the clutch cam 40, the coupling member 43 and the clutch operating member 17 are urged towards either the coupled position or the decoupled position.

The clutch claw 42 includes a pressure receiver 42d on the front end (an example of a second end) thereof. The pressure receiver 42d protrudes in the axial outward direction of the spool shaft 15. The pressure receiver 42d is pressed by the ratchet wheel 72 when the ratchet wheel 71 is rotated in the fishing-line winding direction. Further, the clutch claw 42 includes a guide protrusion 42e integrally formed on the front end thereof. The guide protrusion 42e protrudes towards a guide recess 8i (an example of a guide portion) recessed on the outer surface of the second side plate 8b. The guide protrusion 42e is abutted to the wall of the guide recess 8i for disposing the front end of the clutch claw 42 in a vicinity of the ratchet wheel 72. Thus, the clutch claw 42 is urged by the toggle spring member 47 towards either the disengaged position or the engaged position while being guided by the guide recess 8i. The clutch claw 42 is thereby appropriately positioned either in the disengaged position or the engaged position. It should be noted that the toggle spring member 47 is configured to urge the clutch cam 40 and the coupling member 43 through the clutch claw 42 towards either the coupled position or the decoupled position.

In the aforementioned structure, the pinion gear 32 is normally disposed in the axial-inward clutch-on position. Under the condition, the engaged groove 32b and the engaging pin 15a of the spool shaft 15 are engaged and the clutch-on state is produced. The clutch claw 42 is herein disposed in the disengaged position. On the other hand, the engaged groove 32b and the engaging pin 15a are disengaged and the clutch-off state is produced when the clutch yoke 41 presses and moves the pinion gear 32 in the axial outward direction in conjunction with an operation of the clutch operating member 17. Accordingly, the clutch claw 42 is moved from the disengaged position to the engaged position.

When the handle 2 is operated and rotated in the fishing-line winding direction under the condition, the ratchet wheel 72 is rotated in the fishing-line winding direction. When the ratchet wheel 72 is rotated in the fishing-line winding direction, the teeth 72a of the ratchet wheel 72 press the pressure receiver 42d of the clutch claw 42 towards the disengaged position. When the clutch claw 42 is moved across the dead center of the toggle spring member 47, the clutch claw 42 is urged towards the disengaged position. The clutch cam 40 and the coupling member 43, both of which are coupled to the clutch claw 42, are rotated from the decoupled position to the coupled position in conjunction with movement of the clutch claw 42 to the disengaged position. Accordingly, the clutch mechanism 19 is returned from the clutch-off state to the clutch-on state. The clutch operating member 17 is also herein returned from the second position (i.e., the disengaged position) to the first position (i.e., the engaged position). In the clutch return operation to be executed by operating the handle 2, the clutch claw 42 is coupled not only to the clutch cam 40 but also to the coupling member 43. Therefore, the clutch return operation can be executed without deforming the clutch cam 40. In other words, the clutch return operation can be relatively smoothly executed without strongly rotating the handle 2.

Further, the clutch cam 40 and the coupling member 43 are coupled to the clutch claw 42. Therefore, chances are lowered that shear force due to the coupling member 43 acts on the clutch cam 40. In other words, large shear force does not act on the clutch cam 40.

Dual-bearing Reel Actions

As illustrated in FIG. 6, the clutch operating member 17 is normally disposed in the engaged position, while the clutch yoke 41 is pressed by the coil springs 44 in the axial inward direction of the spool shaft 15. The pinion gear 32 is thereby moved to the engaged position. Under the condition, the engaged groove 32b of the pinion gear 32 and the engaging pin 15a of the spool shaft 15 are engaged and the clutch-on state is thus produced. In the clutch-on state, rotational force of the handle 2 is configured to be transmitted to the spool shaft 15 and the spool 4 through the handle shaft 30, the master gear 31 and the pinion gear 32. It is possible to regulate resistance during rotation of the spool 4 by regulating the tightening amount of the cap 52 of the casting control mechanism 22.

In sinking a terminal tackle in the water, the clutch operating member 17 is pressed downwards. Specifically, the clutch operating member 17 is pressed downwards by the ball of an angler's finger that the tip thereof makes contact with either of the flanges 4a of the spool 4 in thumbing the fishing line. In conjunction with the press operation, the clutch operating member 17a is downwardly rotated about the spool axis X and is moved from the engaged position to the disengaged position.

The clutch operating member 17 and the coupling member 43 are herein coupled to each other. Therefore, the coupling member 43 is rotated about the spool axis X in the counterclockwise direction in FIG. 6 in conjunction with downward rotation of the clutch operating member 17. The coupling member 43 and the clutch cam 40 are coupled through the coupling protrusion 40d, the cam coupling hole 43f and the clutch claw 42. With the coupling structure, the clutch cam 40 is rotated about the spool axis X in the counterclockwise direction against urging force of the toggle spring member 47 and is moved from the coupled position to the decoupled position, when the coupling member 43 is rotated in the counterclockwise direction.

The cam receivers 41a of the clutch yoke 41 are herein abutted to the cam surfaces 40a of the clutch cam 40. Therefore, the clutch yoke 41 is moved to the axial outward direction of the spool shaft 15 (i.e., rightwards in FIG. 4) along the cam surfaces 40a when the clutch cam 40 is rotated in the counterclockwise direction. Further, the clutch yoke 41 is engaged with the small diameter portion 32c of the pinion gear 32. Therefore, the pinion gear 32 is moved in axial outward direction when the clutch yoke 41 is moved in the axial outward direction. Under the condition, the engaging pin 15a of the spool shaft 15 is disengaged from the engaged groove 32b of the pinion gear 32 and the clutch-off state is produced. In the clutch-off state, rotation from the handle shaft 30 is not transmitted to the spool 4. Consequently, the spool 4 is allowed to freely rotate and the fishing line wound about the spool 4 is released by means of the weight of the terminal tackle.

FIG. 7 illustrates a situation of the clutch-off state. The clutch operating member 17 is herein moved downwards to the disengaged position and the coupling member 43 and the clutch cam 40 are thereby rotated. When the guide protrusion 42e formed on the front end of the clutch claw 42 is moved across the dead center of the toggle spring while being guided by the guide recess 8i, the guide protrusion 42e is urged towards the engaged position and is moved towards the ratchet wheel 72.

In starting sinking the terminal tackle into the water, an angler thumbs the fishing line while moving his/her finger slightly obliquely forwards with its tip making contact with either of the flanges 4a of the spool 4.

Next, a case will be explained where the clutch-off state is quickly changed into the clutch-on state after the terminal tackle is disposed in a shelf position in the water. Under the clutch-off state illustrated in FIG. 7, the pressure receiver 42d of the clutch claw 42 is pressed by the teeth 72a of the ratchet wheel 72 when the handle shaft 30 is rotated by the handle 2 in the clockwise direction (i.e., the fishing-line winding direction). When the pressure receiver 42d is accordingly pressed and moved across the dead center of the toggle spring member 47, the clutch claw 42 is returned to the disengaged position by the urging force of the toggle spring member 47. In conjunction with this, the clutch cam 40 is returned to the coupled position and the clutch mechanism 19 is set to be in the clutch-on state.

The clutch claw 42 is herein coupled not only to the clutch cam 40 but also to the coupling member 43. Therefore, the clutch return operation can be executed without deforming the clutch cam 40 when the clutch mechanism 19 is returned to the clutch-on state by rotating the handle 2 in the fishing-line winding direction. Therefore, the clutch return operation can be relatively smoothly executed without strongly rotating the handle 2.

OTHER EXEMPLAY EMBODIMENTS

An exemplary embodiment of the present invention has been described above. However, the present invention is not limited to the aforementioned exemplary embodiment, and a variety of changes can be herein made without departing from the scope of the present invention.

(a) The aforementioned exemplary embodiment has exemplified the clutch operation member applied to the dual-bearing reel including the non-round reel unit. However, the clutch control mechanism of the present invention can be applied to the dual-bearing reels including a round reel unit.

(b) In the aforementioned exemplary embodiment, the clutch operating member 17 is only disposed in the rear part of the reel unit. However, the present invention can be applied to the clutch control mechanism further including another clutch operating member on the top of the reel unit or the like.

(c) In the aforementioned exemplary embodiment, the guide protrusion 42e is directly abutted to the guide recess 8i formed in the reel unit. However, a cover member 142f (242f) made of synthetic resin may be rotatably attached to the outer peripheral surface of a guide protrusion 142e (242e) for covering the guide protrusion 142e (242e) as illustrated in FIG. 10 (11).

Figure 10:
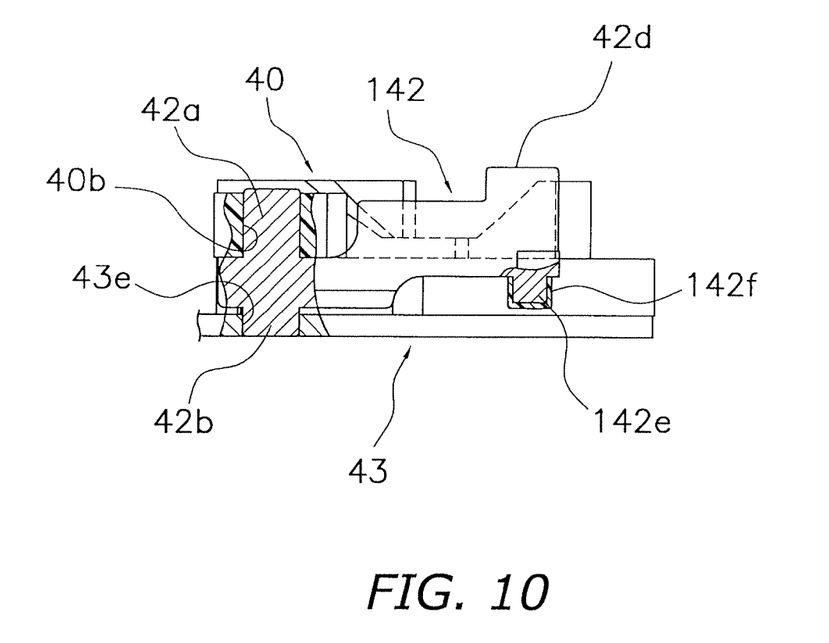
FIG. 10 is a diagram corresponding to FIG. 9 in accordance with another exemplary embodiment.

In FIG. 10, the closed-end tubular cover member 142f is rotatably coupled to the guide protrusion 142e. In this case, the cover member 142f is detachably attached to the guide protrusion 142e and is not prevented from being detached therefrom.

Figure 11:
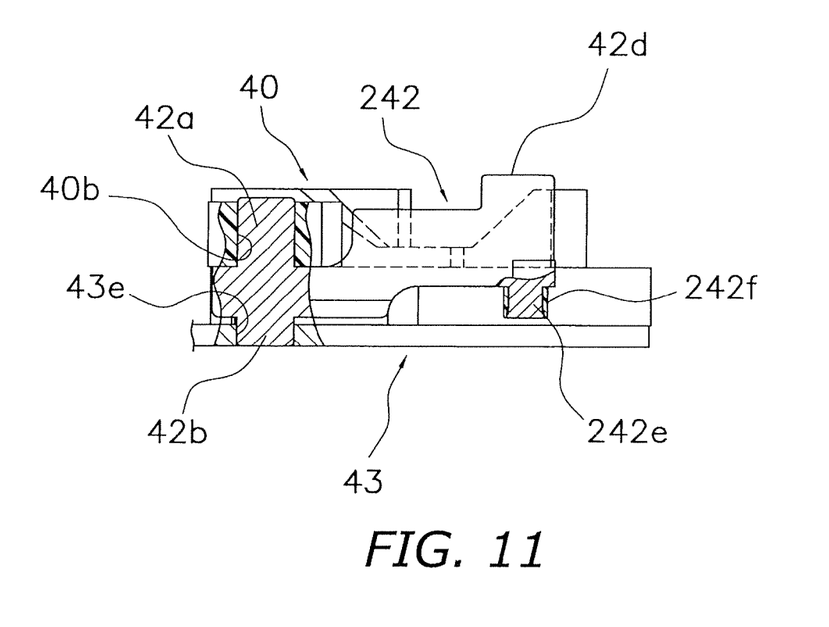
FIG. 11 is a diagram corresponding to FIG. 9 in accordance with yet another exemplary embodiment.

In FIG. 11, the cylindrical cover member 242f is rotatably coupled to the guide protrusion 242e. The tip of the guide protrusion 242e is swaged after the cover member 242f is attached thereto. Therefore, the cover member 242f is prevented from being detached from the guide protrusion 242e.

(d) In the aforementioned exemplary embodiment, the penetrating coupling hole 40d is formed as a first coupling recess in the clutch cam 40, whereas the penetrating claw coupling hole 43e is formed as a second coupling recess in the coupling member 43. However, the first and second coupling recesses may be non-penetrating recesses.

(e) In the aforementioned exemplary embodiment, the clutch claw 42 includes the first and second coupling protrusions 42a and 42b. In the present invention, however, the structure of the coupling protrusion/protrusions is not limited to the above. For example, the clutch cam, the clutch claw and the coupling member may be coupled through a coupling shaft penetrating these components. Alternatively, each of the clutch cam and the coupling member may include a coupling protrusion protruding towards the clutch claw.

Features

The aforementioned exemplary embodiment can be expressed as follows.

(A) The clutch control mechanism 20 (an example of the clutch control device) of the dual-bearing reel is a device for causing the clutch mechanism 19 to couple or decouple the handle 2 attached to the reel unit 1 and the spool 4 configured to be rotated by the handle 2 in response to an operation of the clutch operating member 17 movable between the engaged position (an example of the first position) and the disengaged position (an example of the second position). The clutch control mechanism 20 includes the tubular clutch cam 40, the clutch yoke 41, the coupling member 43, and the clutch return mechanism 46. The clutch cam 40 is attached to the reel unit 1 while being rotatable about the spool axis X. The clutch cam 40 is rotated between the coupled position where the clutch mechanism 19 is set to be in the clutch-on position and the decoupled position where the clutch mechanism 19 is set to be in the clutch-off state in conjunction with movement of the clutch operating member 17 between the engaged position and the disengaged position. The clutch yoke 41 is engaged with the clutch mechanism 19. The clutch yoke 41 is configured to be moved in the axial direction of the spool 4 in conjunction with rotation of the clutch cam 40 for switching the clutch mechanism 19 between the clutch-on state and the clutch-off state. The coupling member 43 is disposed for coupling the clutch cam 40 and the clutch operating member 17. The coupling member 43 is configured to rotate the clutch cam 40 between the coupled position and the decoupled position in conjunction with movement of the clutch operating member 17 between the engaged position and the disengaged position. The clutch return mechanism 46 includes the ratchet wheel 72 (an example of the rotation member), the clutch claw 42 (an example of the clutch return member), and the toggle spring member 47. The ratchet wheel 72 is attached onto the rotation shaft of the handle 2. The clutch claw 42 includes the front end (an example of the first end) and the base end (an example of the second end). The clutch claw 42 is configured to be moved between the engaged position and the disengaged position. The clutch claw 42 is coupled to the clutch cam 40 and the coupling member 43 while the base end thereof is interposed and held between the clutch cam 40 and the coupling member 43. The clutch claw 42 is configured to be moved from the disengaged position to the engaged position in conjunction with rotation of the clutch cam 40 from the coupled position to the decoupled position. In the engaged position, the front end of the clutch claw 42 is engaged with the ratchet wheel 72. The front end of the clutch claw 42 is pressed by the ratchet wheel 72 in conjunction with rotation of the handle 2 in the fishing-line winding direction. The clutch claw 42 is thereby moved from the engaged position to the disengaged position. Accordingly, each of the clutch cam 40 and the coupling member 43 is returned to the coupled position. The toggle spring member 47 is configured to urge the clutch claw 42 towards either the engaged position or the disengaged position.

In the clutch control mechanism 20, for instance, the clutch cam 40 is rotated from the coupled position to the decoupled position through the coupling member 43 when the clutch operating member 17 is moved from the engaged position to the disengaged position. Accordingly, the clutch mechanism 19 is set to be in the clutch-off state. On the other hand, the clutch claw 42 is moved from the disengaged position to the engaged position when the clutch cam 40 is rotated from the coupled position to the decoupled position. The clutch claw 42 is thereby moved to the position where it is allowed to be engaged with the ratchet wheel 72. The clutch claw 42 is herein urged towards the engaged position by means of the toggle spring member 47.

When the handle 2 is rotated in the fishing-line winding direction while the clutch mechanism 19 is set to be in the decoupled state, the ratchet wheel 72 is rotated in the fishing-line winding direction and the clutch claw 42 is pressed towards the disengaged position. When then moved across the dead center of the toggle spring member 47, the clutch claw 42 is urged towards the disengaged position. In conjunction with the movement of the clutch claw 42 to the disengaged position, the clutch cam 40 and the coupling member 43, both of which are coupled to the clutch claw 42, are rotated from the decoupled position to the coupled position. Accordingly, the clutch mechanism 19 is returned from the decoupled state to the coupled state. The clutch operating member 17 is also herein returned from the disengaged position to the engaged position. The clutch return operation can be executed by operating the handle 2 without deforming the clutch cam 40 due to the structure that the clutch claw 42 is coupled not only to the clutch cam 40 but also to the coupling member 43. Consequently, the clutch return operation can be relatively smoothly executed without strongly rotating the handle 2.

(B) In the clutch control mechanism 20 of the dual-bearing reel, the clutch cam 40 is held in either the coupled position or the decoupled position by means of the toggle spring member 47 through the clutch claw 42. Accordingly, the coupling member 43 and the clutch operating member 17 are held in either the coupled position or the decoupled position, while the clutch cam 40 is held in either the coupled position or the decoupled position by the toggle spring member 47 urging the clutch claw 42. Therefore, it is possible to simply form the structure for holding the clutch cam 40, the coupling member 43 and the clutch operating member 17 in either of the aforementioned two positions.

(C) In the clutch control mechanism 20 of the dual-bearing reel, the clutch claw 42 includes the first and second coupling protrusions 42a and 42b on the front end thereof. The first coupling protrusion 42a protrudes towards the clutch cam 40 in a columnar shape and is coupled to the clutch cam 40. The second coupling protrusion 42b is disposed concentric to the first coupling protrusion 42a. The second coupling protrusion 42b protrudes towards the coupling member 43 in a columnar shape and is coupled to the coupling member 43. The clutch cam includes the coupling hole 40b (an example of the first coupling recess) allowing the first coupling protrusion 42a to be rotatably coupled thereto. The coupling member 43 includes the claw coupling hole 43e (an example of the second coupling recess) allowing the second coupling protrusion 42b to be rotatably coupled thereto. In this case, the clutch cam 40 is coupled to the clutch claw 42 through the rotatable first coupling portion 42a, whereas the coupling member 43 is coupled to the clutch claw 42 through the rotatable second coupling protrusion 42b. Therefore, force to be produced by the movement of the clutch claw 42 to the disengaged position is smoothly transmitted to the clutch cam 40 and the coupling member 43. Accordingly, the clutch return operation can be further smoothly executed without strongly rotating the handle.

(D) In the clutch control mechanism 20 of the dual-bearing reel, the clutch operating member 17 is fixed to the coupling member 43. The coupling member 43 is configured to rotate the clutch cam 40 from the decoupled position to the coupled position in conjunction with the movement of the clutch operating member 17 from the disengaged position to the engaged position. In this case, the clutch mechanism 19 can be returned from the clutch-off state to the clutch-on state not only by rotation of the handle 2 in the fishing-line winding direction but also by movement of the clutch operating member 17 from the disengaged position to the engaged position. Therefore, the clutch return action can be instantly executed.

(E) In the clutch control mechanism 20 of the dual-bearing reel, the reel unit 1 includes the guide recess 8i (an example of the guide portion) for guiding the front end of the clutch claw 42. Further, the clutch claw 42 includes the guide protrusion 42e. The guide protrusion 42e is integrally formed with the front end of the clutch claw 42 while protruding towards the guide recess 8i. Therefore, the clutch claw 42 is smoothly moved while the guide protrusion 42e thereof is guided by the guide recess 8i. Consequently, the clutch return operation can be further smoothly executed without strongly rotating the handle.

(F) In the clutch control mechanism 20, the reel unit 1 is made of aluminum alloy and the clutch claw 142 (or 242) is made of stainless alloy. Further, the guide protrusion 142e (or 242e) protrudes in a columnar shape. Yet further, the tubular cover member 142f (or 242f) made of synthetic resin is rotatably attached onto the outer peripheral surface of the guide protrusion 142e (or 242e) for covering the outer peripheral surface of the guide protrusion 142e (or 242e).

Accordingly, the guide protrusion 142e (or 242e) made of stainless alloy and the guide recess 8i made of aluminum alloy are prevented from directly making contact with each other. Even when the guide protrusion 142e (or 242e) is abutted onto and guided along the guide recess 8i, galvanic corrosion can be prevented from occurring between the guide protrusion 142e (or 242e) and the guide recess 8i due to contact between metals forming the guide protrusion 142e (or 242e) and the guide recess 8i.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel clutch control device controlling a clutch mechanism to couple and decouple a handle attached to a reel unit and a spool configured to be rotated by the handle in conjunction with an operation of a clutch operating member, the clutch operating member being movable between a first position and a second position, the dual-bearing reel clutch control device comprising:
    a tubular clutch cam attached to the reel unit to be rotated about a center axis of the spool, the tubular clutch cam configured to be rotated between a coupled position and a decoupled position in conjunction with movement of the clutch operating member between the first position and the second position, the clutch mechanism being in a coupled state with which the handle is coupled with the spool when the clutch operating member is in the first position, the clutch mechanism being in a decoupled state with which the handle is decoupled with the spool when the clutch operating member is in the second position;
    a clutch yoke being engaged with the clutch mechanism, the clutch yoke being configured to be movable in an axial direction of the spool in conjunction with rotation of the tubular clutch cam for switching the clutch mechanism between the coupled state and the decoupled state;
    a coupling member being configured to couple the tubular clutch cam and the clutch operating member, the coupling member configured to rotate the tubular clutch cam between the coupled position and the decoupled position in conjunction with the movement of the clutch operating member between the first position and the second position; and
    a clutch return mechanism being coupled with the tubular clutch cam and the coupling member, the clutch return mechanism including
        a rotation member attached to a rotation shaft of the handle,
        a clutch return member having a first end and a second end, the clutch return member configured to be moved between an engaged position at which the clutch return member is engaged with a ratchet wheel and a disengaged position at which the clutch return member is disengaged with the ratchet wheel, and
        a toggle spring member configured to urge the clutch return member towards either the engaged position or the disengaged position,
        the first end thereof being interposed and held between the tubular clutch cam and the coupling member,
        the clutch return member being configured to be movable from the disengaged position to the engaged position in order to allow the second end to be engaged with the rotation member in conjunction with rotation of the tubular clutch cam from the coupled position to the decoupled position,
        the clutch return member being configured to be movable from the engaged position to the disengaged position while the second end is pressed by the rotation member in conjunction with rotation of the handle in a fishing-line winding direction for returning each of the tubular clutch cam and the coupling member to the coupled position.

2. The dual-bearing reel clutch control device according to claim 1, wherein
    the clutch cam is held in either the coupled position or the decoupled position by the toggle spring member through the clutch return member.

3. The dual-bearing reel clutch control device according to claim 1, wherein
    the clutch return member includes a first coupling protrusion and a second coupling protrusion on the first end,
    the first coupling protrusion has a columnar shape and protrudes towards the clutch cam,
    the first coupling protrusion is coupled to the clutch cam,
    the second coupling protrusion being coaxial with the first coupling protrusion,
    the second coupling protrusion has a columnar shape and protrudes towards the coupling member,
    the second coupling protrusion is coupled to the coupling member,
    the clutch cam includes a first coupling recess being configured to allow the first coupling protrusion to be coupled thereto in a rotatable state, and
    the coupling member includes a second coupling recess being configured to allow the second coupling protrusion to be coupled thereto in a rotatable state.

4. The dual-bearing reel clutch control device according to claim 1, wherein
    the clutch operating member is fixed to the coupling member, and
    the coupling member is configured to rotate the clutch cam from the decoupled position to the coupled position in conjunction with movement of the clutch operating member from the second position to the first position.

5. The dual-bearing reel clutch control device according to claim 1, wherein
    the reel unit includes a guide portion for guiding the second end of the clutch return member,
    the clutch return member includes a guide protrusion integrally formed with the second end, and
    the guide protrusion protrudes towards the guide portion.

6. The dual-bearing reel clutch control device according to claim 5, wherein
    the reel unit is made of aluminum alloy,
    the clutch return member is made of stainless alloy,
    the guide protrusion has a columnar shape, and
    the guide protrusion further includes a synthetic resin tubular cover member rotatably attached to an outer peripheral surface thereof for covering the outer peripheral surface.

* * * * *